United States Patent

Hoshino

[11] Patent Number: 5,272,952
[45] Date of Patent: Dec. 28, 1993

[54] HOOP CLAMP FOR A BASS DRUM
[75] Inventor: Yoshiki Hoshino, Aichi, Japan
[73] Assignee: Hoshino Gakki Co., Ltd., Japan
[21] Appl. No.: 969,401
[22] Filed: Oct. 30, 1992
[30] Foreign Application Priority Data
  Jan. 28, 1992 [JP] Japan .................. 4-008563
[51] Int. Cl.⁵ .......................... G10D 13/02
[52] U.S. Cl. .................. 84/411 R; 24/495; 24/498; 24/514; 248/231.5
[58] Field of Search .......... 84/411 R, 421; 24/495, 24/498, 514; 248/231.5, 316.5

[56] References Cited

U.S. PATENT DOCUMENTS

| | | | |
|---|---|---|---|
| 849,517 | 4/1907 | Wanamaker | 24/514 |
| 923,610 | 6/1909 | Wanamaker | 84/411 R |
| 1,330,814 | 2/1920 | Meyer | 84/411 R |
| 1,416,522 | 5/1922 | Straight | 84/411 R |
| 1,607,769 | 11/1926 | Meyer | 84/411 R |
| 1,924,784 | 2/1932 | Greenleaf | 84/411 R |
| 2,971,738 | 2/1961 | Way | 84/411 R |
| 4,854,016 | 8/1989 | Rice | 24/495 |

Primary Examiner—Michael L. Gellner
Assistant Examiner—P. Stanzione
Attorney, Agent, or Firm—Ostrolenk, Faber, Gerb & Soffen

[57] ABSTRACT

A clamp for being attaching to a drum hoop. The clamp includes a main support body having a hoop receiving part that contacts the outside of the drum hoop. L-shaped members having a hoop pressing part, for pressing against the inside of the drum hoop, and a lever, connected to the hoop pressing part, are rotatably attached to the main support body. A threaded screw passes through one lever part and the tip of the screw contacts the second lever. Advancing the screw mutually separates the levers to press the hoop pressing parts against the hoop. The main support body may be adapted for supporting an attachment to the drum such as a cowbell.

9 Claims, 4 Drawing Sheets

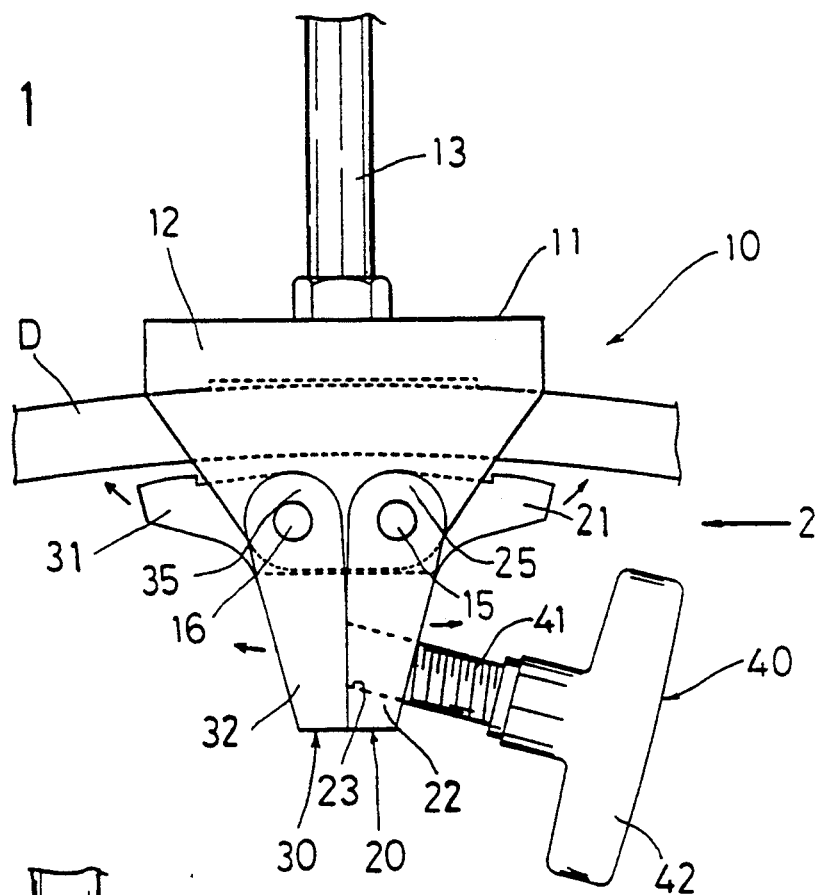
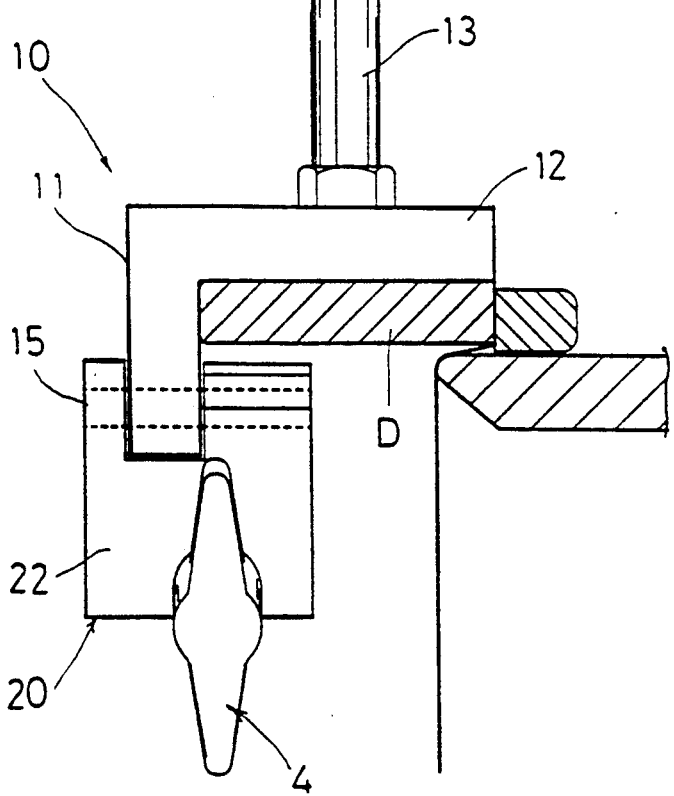

HOOP CLAMP FOR A BASS DRUM

BACKGROUND OF THE INVENTION

The present invention relates to an improved hoop clamp for a bass drum, or the like.

DESCRIPTION OF A PRIOR ART EMBODIMENT

A holder 50, known in the prior art, is shown in FIGS. 4-7. Such a holder is used for supporting an attachment, like a cow bell, installed on a bass drum.

The holder 50 comprises a hoop clamp 51 equipped with a stand 55 for supporting the attachment. The hoop clamp 51 has a support plate 52 on the outside of the hoop and a tightening plate 53 on the inside of the hoop. The plate 53 has an end 57 which engages the support plate 52. As the tightening plate 53 is tightened, by a tightening nut 54, which pivots it around the end stand toward the plate 52, the hoop clamp 51 is also tightened and fixed in place by the plates 52 and 53 clamping against the hoop 61 of the drum 60. A tightening bolt is received in and cooperates with the nut 54. A spring 58 on the bolt 56 prevents play between the plates due to free movement of the plate 53. The illustrated attachment 59 is a cow bell, although almost anything may be supported.

Because the thickness of the drum hoop may vary, depending upon the specifications of the drum, the different manufacturers or the materials used, there is often an inadequate tightening effect caused by the tightening nut 54 on the plate 53, as is shown in FIG. 7. In FIG. 7, the thickness of the hoop is too large for the spacing in the clamp, so that the holder 50 is unstable because only a small part of the tightening plate 53 is pressed against the drum hoop 61. This could enable the holder 50 to be shaky or to twist or bend due to the load of the attachment or the vibrations created when the drum is used.

In addition, when the thickness of the hoop is small, clamping is only carried out by a tip of the pressing part of the tightening plate 53 making the fixing of the holder 50 uncertain. Moreover, with a hoop made of wood, the tightening plate 53 tends to sink into the hoop upon tightening the tightening nut 54. This could damage the hoop considerably and eventually may crack the hoop in some cases.

SUMMARY OF THE INVENTION

The present invention has an object of solving the aforementioned problems. It is an object of the present invention to provide a hoop clamp which is capable of accurate installation on the drum hoop without damaging the hoop even with various hoops having different thicknesses. A further object of the present invention is to provide a hoop clamp for installation of an attachment, such as a cow bell, which hoop clamp does not become unsteady or twisted by the weight of the attachment or by the vibrations created by striking the drum.

The present invention relates to a hoop clamp primarily for use on a bass drum. The clamp has a main support body, which may be equipped with a support part for an attachment. The clamp has a hoop receiving part that contacts the periphery or outside of the drum hoop. Tightening means attached to the main support body include a first and second hoop pressing part, which are both brought into contact with the inside of the hoop. Each hoop pressing part is freely rotatable with respect to the main support body. It is also separated from the hoop receiving part so as to form a gap for receiving the drum hoop. Means are provided for rotating the hoop pressing parts to clamp the drum hoop between both hoop pressing parts and the hoop receiving part.

The hoop clamp may also include a first and a second lever connected with the respective hoop pressing parts. A screw having a threaded shank passes through a threaded hole in the first lever until the tip of the screw contacts the second lever. Advancing the screw mutually separates the two parts of the hoop pressing parts contacted by the screw to rotate the pressing parts to secure the clamp to the drum hoop.

Other features and advantages of the present invention will become apparent from the following description of the invention which refers to the accompanying drawings.

BRIEF DESCRIPTION OF THE DRAWINGS

FIG. 1 is a front view of the hoop clamp in its loosened state.

FIG. 2 is a view in the direction of arrow 2 of FIG. 1.

DETAILED DESCRIPTION OF THE INVENTION

Figure 3:
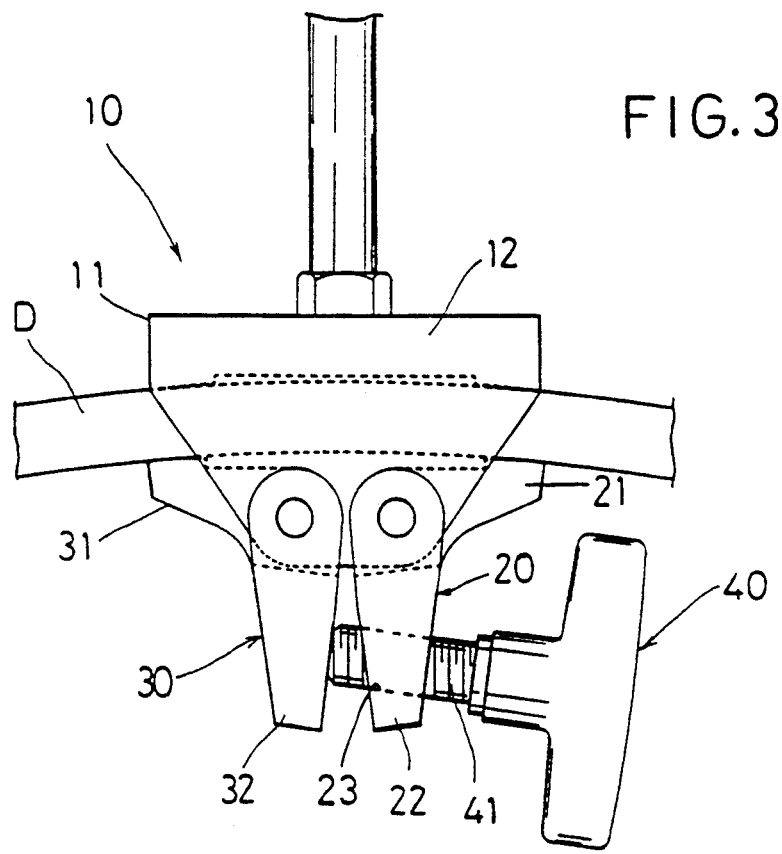
FIG. 3 is a front view of the hoop clamp in its tightened state.
Figure 4:
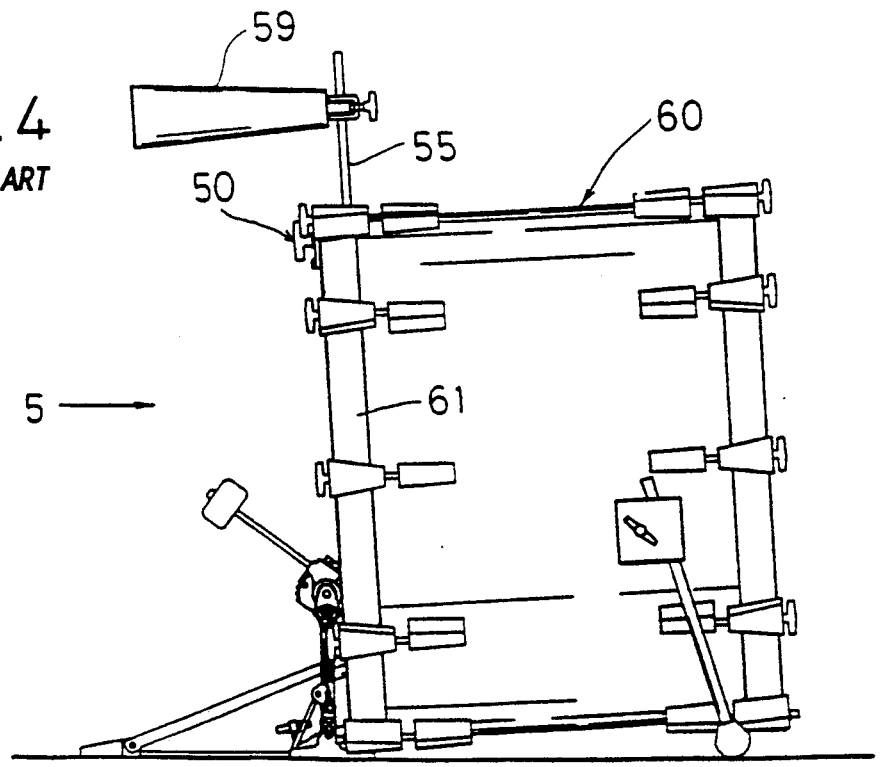
FIG. 4 shows a cow bell installed on a bass drum by a hoop clamp according to prior art.
Figure 5:
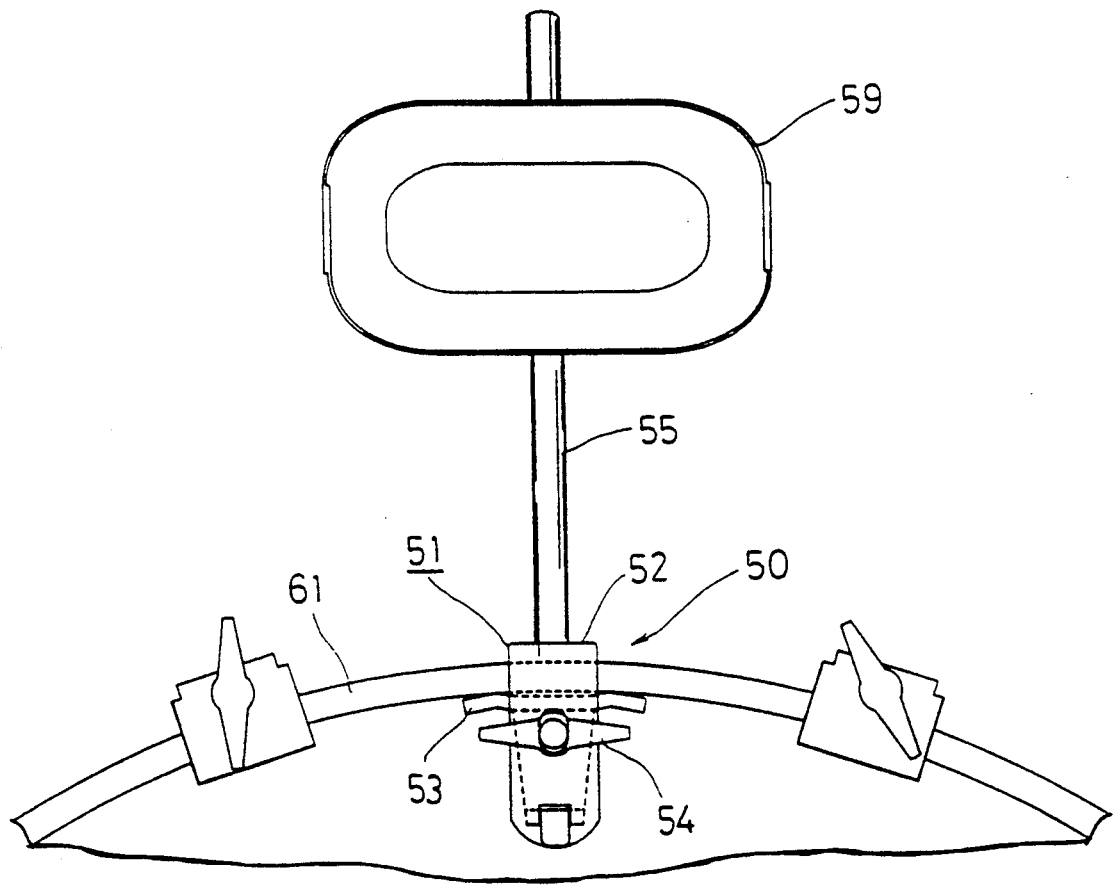
FIG. 5 is a view in the direction of the arrow 5 of FIG. 4.
Figure 6:
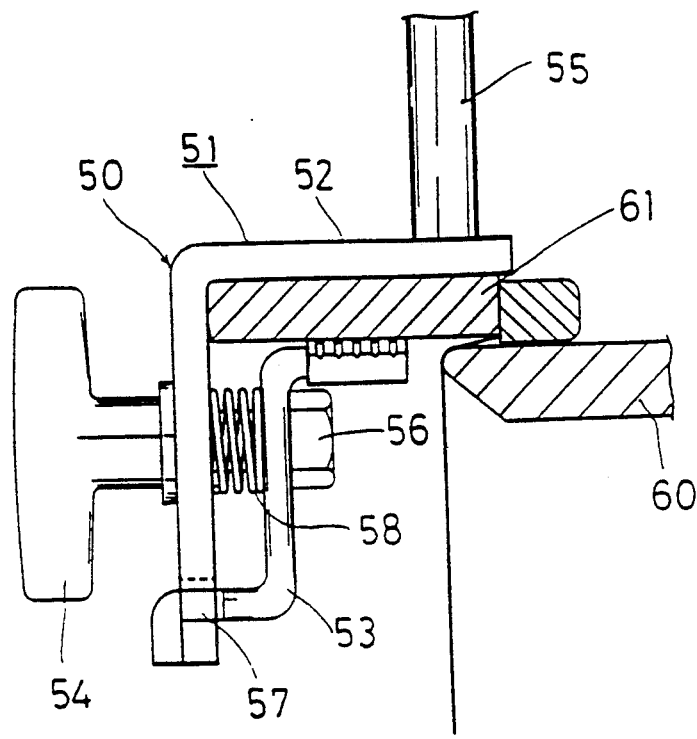
FIG. 6 is a cross section of the hoop clamp according to the prior art.
Figure 7:
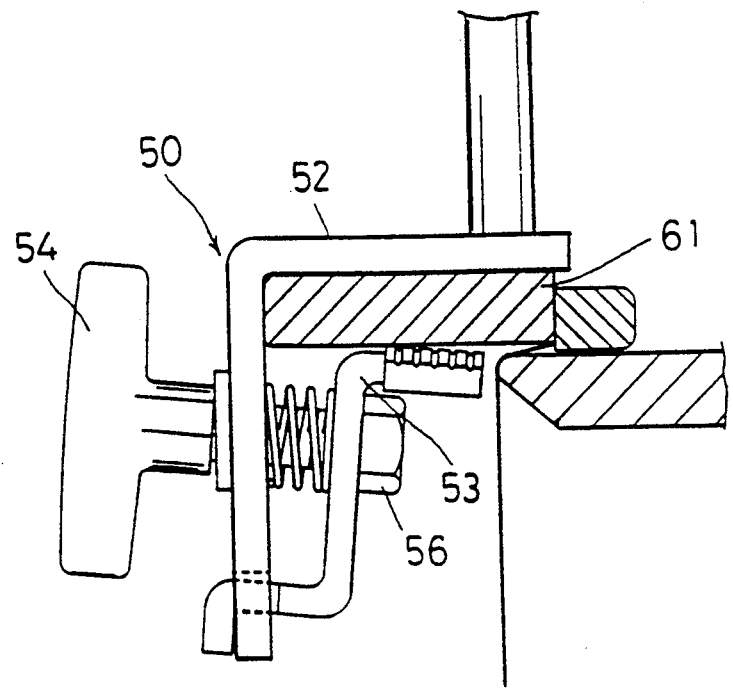
FIG. 7 is a cross section of the prior art hoop clamp in its tightened state.

FIGS. 1 and 2 show the hoop clamp 10 of the invention as comprising a main support body 11, a first hoop tightening member 20, a second hoop tightening member 30 and a tightening screw 40 which cooperates with both members 20, 30.

The main support body 11 has an L-shaped cross section as seen in FIG. 2. Its bent off tip is constructed as a curved around hoop receiving part 12 which contacts the outside of the curved drum hoop D. On the main support body 11, there may be provided a support part, like a stand 13, for supporting an attachment such as a cow-bell or a wood block.

The first hoop tightening member 20 includes a first hoop pressing part 21 which contacts the drum hoop D at the inside. It also includes a first lever 22 which moves together with the part 21. The first tightening member 20 may be formed in the shape of an L, as is shown in FIG. 1. It is fixed to the main support body 11 in a freely rotatable fashion, at its bend at an axis 15.

A screw hole 23 runs through the first lever 22. The screw threaded shank 41 of the tightening screw 40 is screwed into the threaded hole 23. The tightening screw 40 includes the screw shank 41 and the handle 42.

The second tightening member 30 is also L-shaped and includes a hoop pressing part 31, which contacts the inside of the hoop D, and a lever 32. The second tightening member 30 may also be formed in the shape of an L. It is fixed in a freely rotatable manner to the main support body 11 at its bend 35 at an axis 16.

The tip of the screw shank 41 touches the side of the second lever 32 of the second tightening member 30 as the screw is screwed into the screw hole 23 of the first tightening member 20.

As is shown in FIG. 3, the hoop clamp 10 holds a drum hoop D between the hoop receiving part 12 of the main support body 11, the hoop pressing part 21 of the first tightening member 20 and the hoop pressing part 31 of the second tightening member 30.

Since the first and second tightening members 20, 30 are supported freely rotatably at the axes 15 and 16, the lever 22 of the first tightening member 20 and the lever 32 of the second tightening member 30 are mutually opened as the tightening screw 40 is advanced. This rotates the hoop pressing parts 21 and 31 toward the drum hoop D, thereby pressing the drum hoop D from inside.

Inasmuch as the first tightening member 20 and the second tightening member 30 work as levers, using their bends 25 and 35 as fulcrums in relation to the drum hoop D, the force of the tightening screw 40, which mutually separates the lever parts 22 and 32, is proportionately increased at the hoop pressing parts 21 and 31. This combination compressively tightens the drum hoop D and accurately fixes the hoop clamp 10.

The entire pressing surface of the hoop clamp 10 is in contact with the bass drum hoop at all times. Moreover, clamping can be effected at two locations around the hoop even when the drum hoops may have different thicknesses along its circumference. Therefore, the possibility of the hoop being damaged by the pressing parts 21, 31 is eliminated, while it also provides a high holding strength against twisting or bending.

A strong compressive tightening force is provided using the lever principle. With attachments such as a cow bell or a wood block and also with a fixed attachment such as a high hat stand in a twin bass drum set, the possibility of the hoop clamp slipping or twisting due to the weight of attachment or due to vibrations generated at the time of striking the drum is avoided, thereby making the attachment fixed and stable.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A clamp for a drum hoop, comprising:
   a main support body having a hoop receiving part for contacting the outside of the drum hoop;
   tightening means, attached to the main support body, and having a first hoop pressing part and a second hoop pressing part both located at the inside of the drum hoop, both hoop pressing parts being separated from the hoop receiving part of the main support to form a gap between the receiving part and both pressing parts for receiving the drum hoop; each pressing part being freely rotatable with respect to the main support body for being pressable against the inside of the drum hoop; and
   means for rotating the first and the second hoop pressing parts, respectively, to positively clamp the drum hoop between the respective pressing parts and the hoop receiving part.

2. A clamp according to claim 1, further comprising means on the main support body for supporting an attachment to the drum.

3. A clamp according to claim 2, wherein the rotating means comprises a screw having a threaded shank and a pressing tip extending therefrom;
   the tightening means having a first lever and a second lever connected with the first and the second hoop pressing parts, respectively, the first lever having a threaded hole for receiving the threaded part of the screw with the tip extending into contact with the second lever so that advancing the screw through the hole causes the screw to mutually separate the lever parts thereby to press the respective hoop pressing parts against the inside of the drum hoop.

4. A clamp according to claim 3, wherein each of the levers is connected with the respective hoop pressing part to form a respective L-shaped member, each member being rotatably attached to the main support through an axis passing through the bend of the respective member.

5. A clamp according to claim 3, wherein each pressing part is rotatably attached to the main support through an axis through the respective member.

6. A clamp according to claim 5, wherein the axes are parallel to each other.

7. A clamp according to claim 6, wherein the screw has a handle for advancing and retracting the screw.

8. A clamp according to claim 2, wherein the rotating means comprises a screw passing through the first pressing part and into engagement with a side of the second pressing part such that advancing the screw against the second pressing part mutually separates the pressing parts to press the pressing parts against the inside of the drum hoop.

9. A clamp according to claim 8, wherein each pressing part is rotatably attached to the main support through an axis through the respective member.

* * * * *